Figure 1:
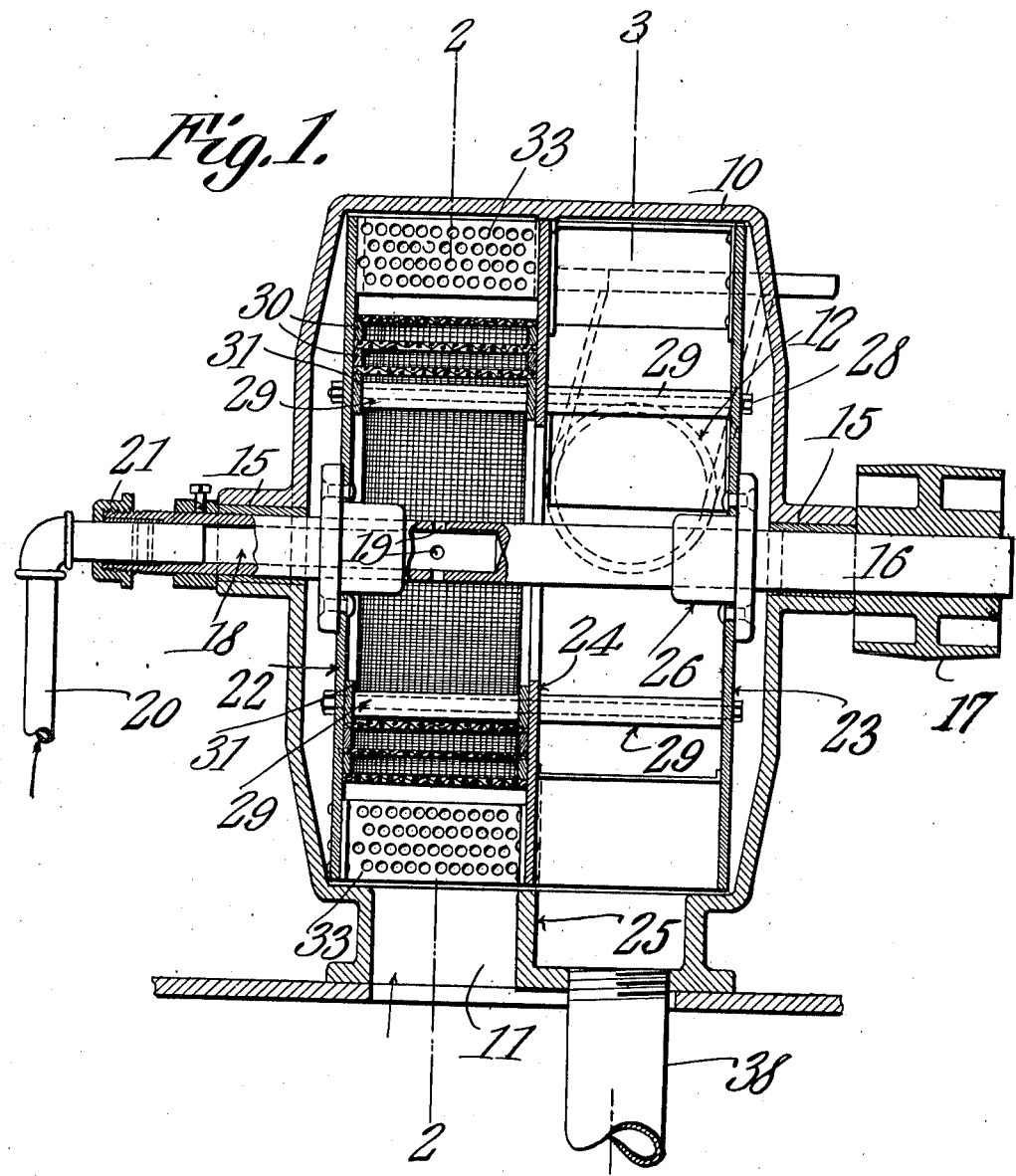

P. G. SCHMIDT.
METHOD OF TREATING GASES.
APPLICATION FILED DEC. 10, 1909.

1,026,227.

Patented May 14, 1912.
5 SHEETS—SHEET 1.

Witnesses
E. P. Stewart
F. T. Chapman

Inventor
Peter G. Schmidt.
By C. A. Snow & Co.
Attorneys

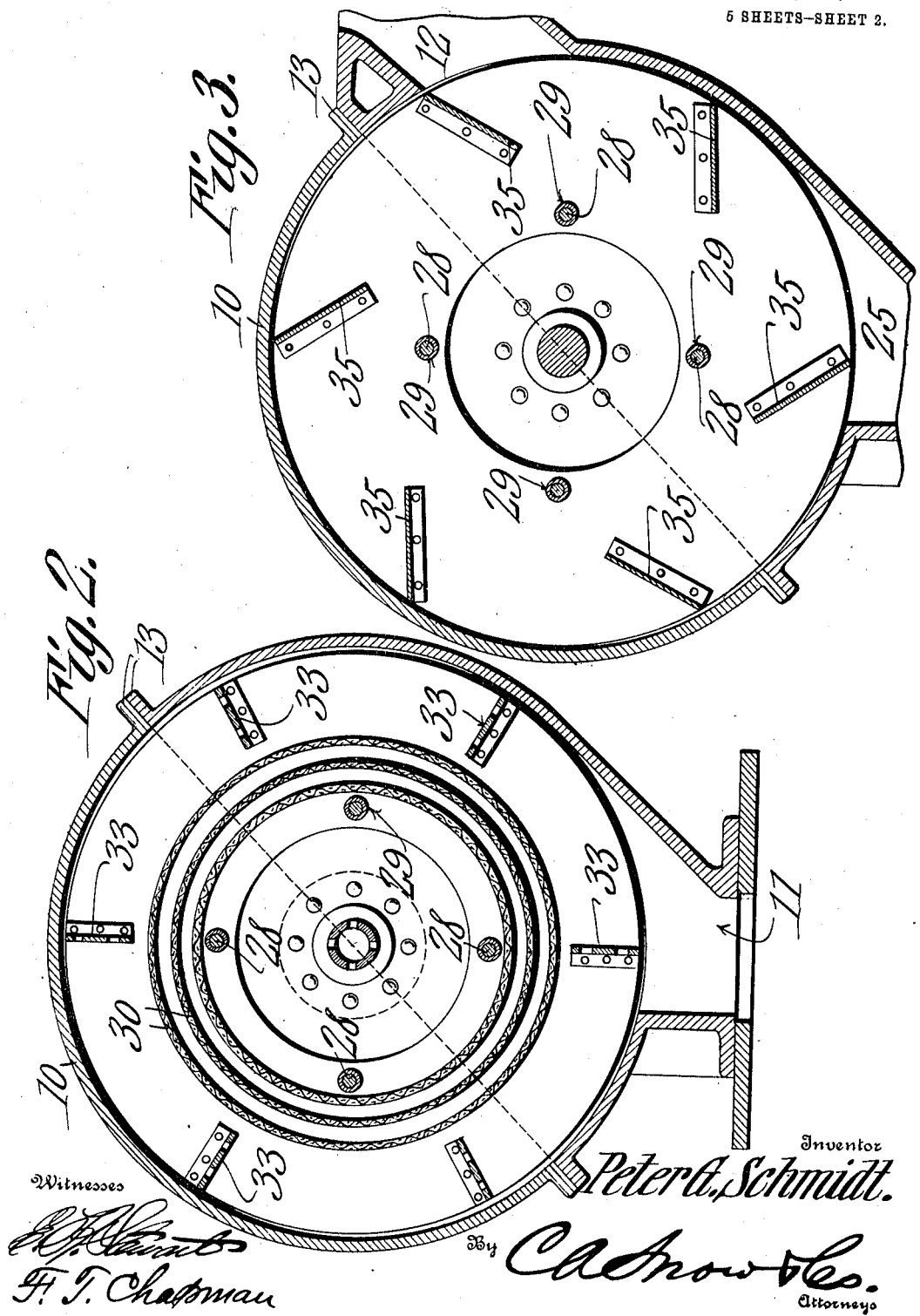

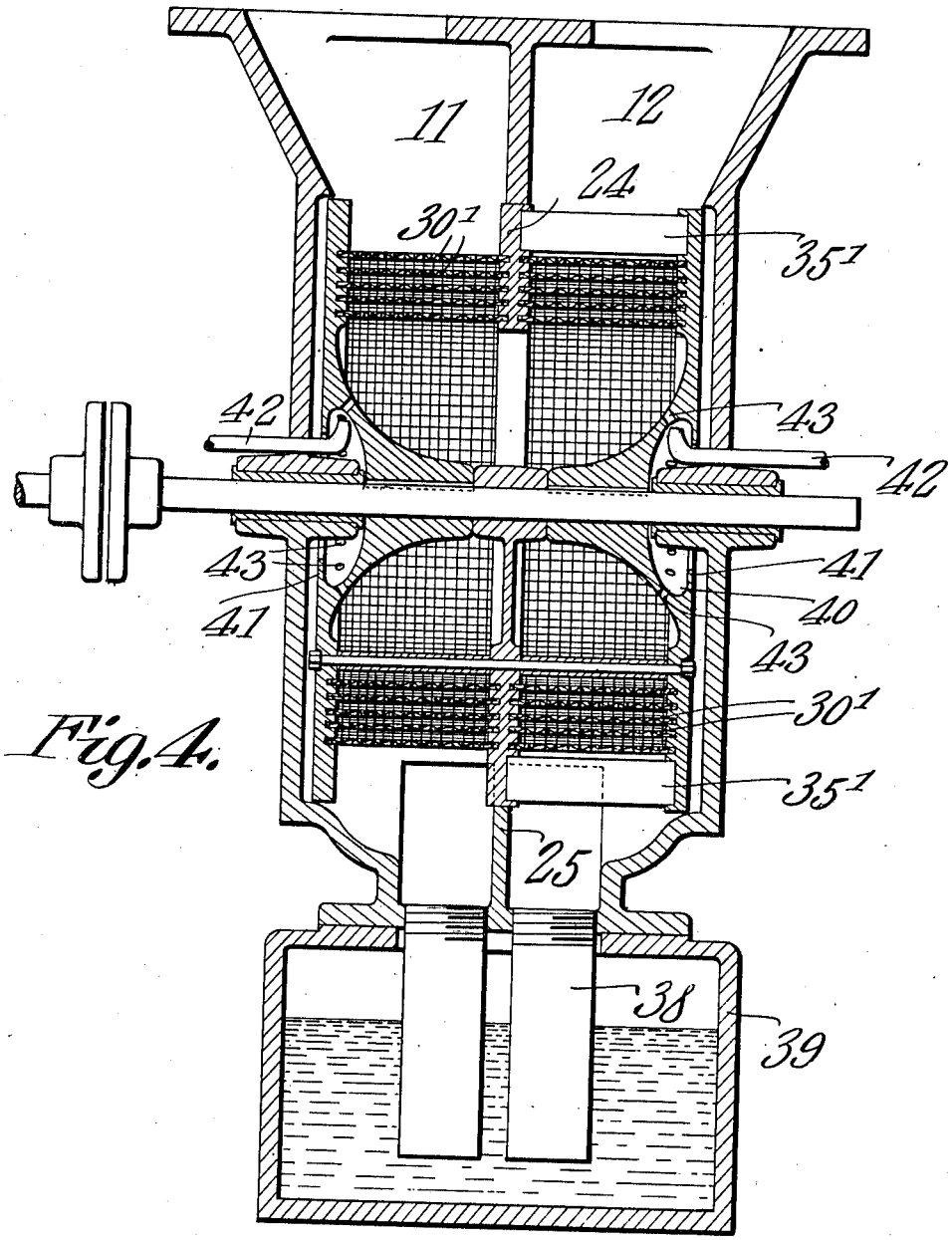

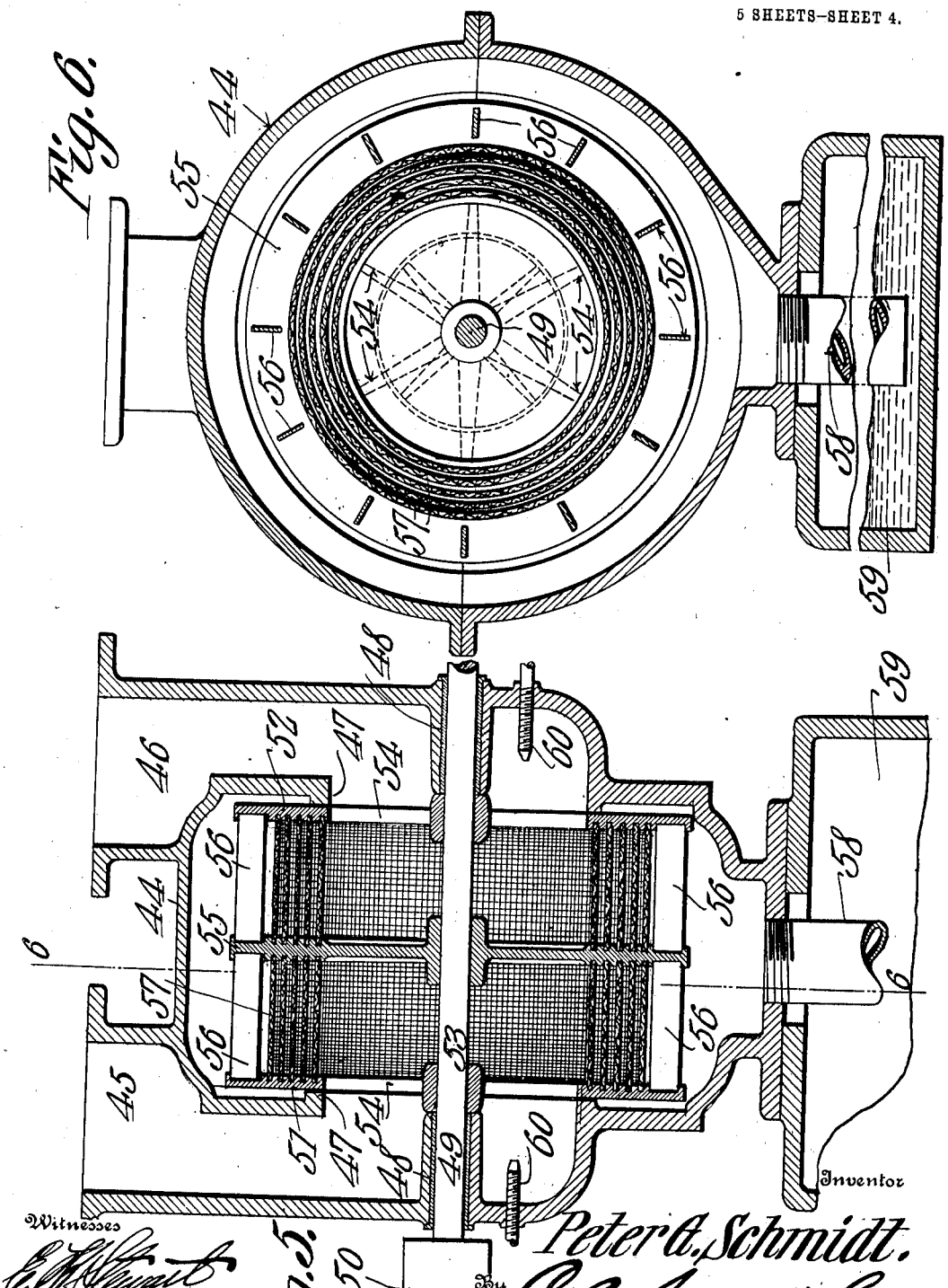

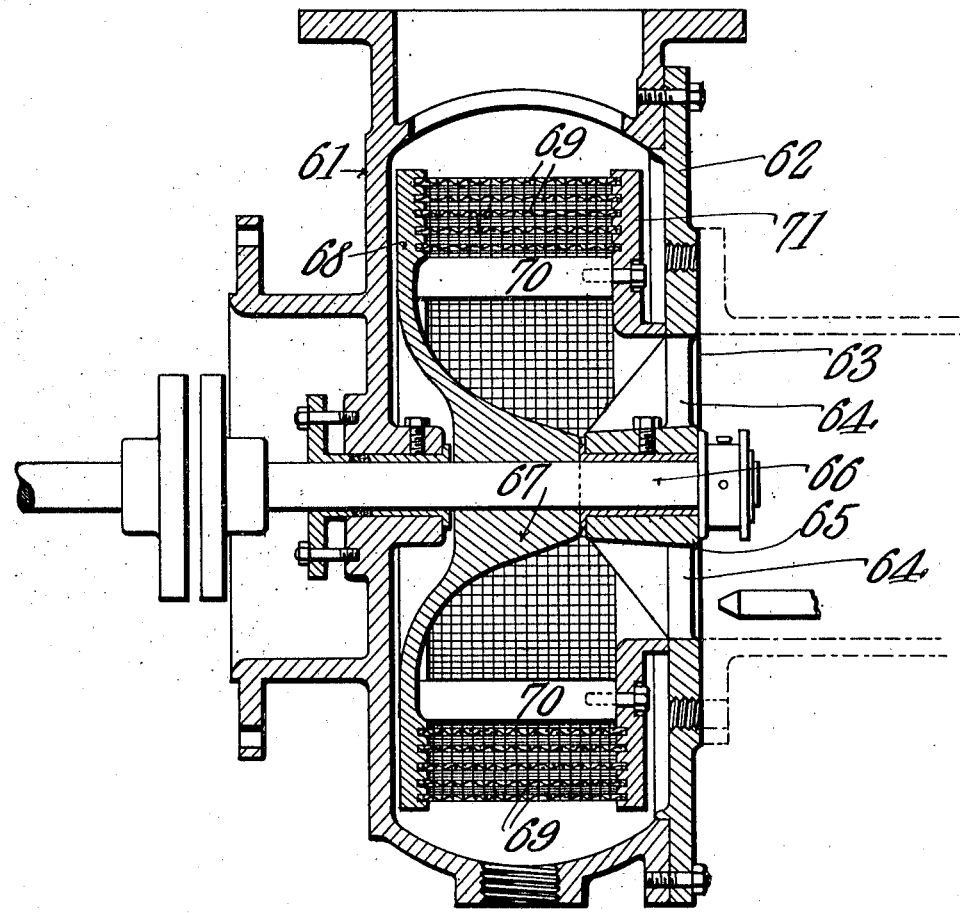

UNITED STATES PATENT OFFICE.

PETER G. SCHMIDT, OF OLYMPIA, WASHINGTON.

METHOD OF TREATING GASES.

1,026,227.          Specification of Letters Patent.          Patented May 14, 1912.

Original applications filed September 10, 1909, Serial Nos. 517,065 and 517,066. Divided and this application filed December 10, 1909. Serial No. 532,474.

*To all whom it may concern:*

Be it known that I, PETER G. SCHMIDT, a citizen of the United States, residing at Olympia, in the county of Thurston and State of Washington, have invented a new and useful Method of Treating Gases, of which the following is a specification.

This invention has reference to improvements in the method of treating gases especially for the washing or cleansing of the same, and its object is to provide for the elimination from the gas of absorbed or entrained impurities such as dust, tar, vapors, volatile matters, or any other matters of mechanical or chemical nature.

In accordance with the present improved method of treating gases, and by the term gas it is intended to include air, the gas is thoroughly broken up or subdivided in the presence of a very finely divided liquid spray, mist, or cloud, preferably of water, the resultant compound of water and impurities being a mixture or emulsion of particular intimacy.

In one form of the invention the gas treating fluid, which for the convenience of description will be hereinafter considered as water, is subjected to the action of a high speed rotor with which the water is caused to whirl at great linear velocity and at the same time is very highly subdivided so as to take the form of a fine mist or cloud and this mist or cloud is driven outwardly by centrifugal force, the form of the rotor and its great speed contributing to the high subdivision and lineal speed of the cloud or mist of water. It is into such rapidly whirling and highly agitated cloud or mist that the gas is directed and is also beaten and whirled by the rotor until the gas itself becomes highly divided and is brought into intimate contact with the cleansing fluid.

Because of the high subdivision of the particles of water they present a greatly extended absorption surface and since the gas itself is also highly divided and thoroughly intermixed with the mist or vapor, it is most thoroughly subjected to the action of the cleansing fluid and is rapidly freed from the absorbed or entrained impurities. The separated impurities are carried by the watery cleansing mist or cloud to the inner walls of an inclosing chamber for the rotor to be conducted thereby to a suitable point of disposal, the watery mist and impurities carried thereby being driven by centrifugal force to the inner walls of the inclosing casing.

In carrying out the invention the gas to be cleansed or purified may be directed through the rotor in a direction opposed to centrifugal force and to the general direction of movement of the cleansing fluid, and then be directed with the cleansing fluid in the same course as the latter travels under the action of centrifugal force.

Instead of first directing the gas to be treated against the action of centrifugal force, it may first move in the same direction as the cleansing fluid under the action of centrifugal force and then its direction may be changed so that the gas travels in opposition to the movement of the cleansing fluid under the action of centrifugal force. Or, the gas may move with the cleansing fluid in the same direction under the action of centrifugal force and the reverse movement of the gas may be omitted.

The invention will be best understood from a consideration of the following detail description taken in connection with the accompanying drawings illustrating apparatus capable of carrying out the methods forming the subject matter of the present invention, in which drawings, Figure 1 is a vertical section of a gas treating structure capable of treating the gas when first moving against the action of centrifugal force and then with it. Fig. 2 is a section on the line 2—2 of Fig. 1. Fig. 3 is a section on the line 3—3 of Fig. 1. Fig. 4 is a view similar to that of Fig. 1 and illustrating another form of apparatus capable of being utilized for the practice of the invention. Fig. 5 is a section similar to that of Fig. 1 but showing an apparatus wherein the gas must first move in the same direction as the action of centrifugal force and then in opposition thereto. Fig. 6 is a section on the line 6—6 of Fig. 5. Fig. 7 is a sectional elevation of an apparatus through which the gas flows only in the same direction as the action of centrifugal force.

Referring to the drawings and particularly to Figs. 1, 2 and 3 there is shown a gas washer capable of being used in the practice of the present invention where the gas is first directed against the action of centrifugal force and then moves in the same direction as the action of such force. In the structure shown in these figures there is provided a main casing 10 of generally cylindrical form and preferably made in two sections connected by bolting flanges 13 as shown in Figs. 2 and 3. At the bottom of the casing is an inlet port 11 through which the gas passes into the washer and a discharge port 12 through which the cleansed gas passes off to a gas engine or a gasometer or other means of utilization or storage. The opposite walls of the casing are provided with bushings 15 that form bearings for a shaft 16 provided at one end with a belt pulley 17 or some equivalent means. The shaft is bored out at one end in order to form a water passage 18 from which lead spraying ports 19 for water employed for washing purposes, such water being forced in the form of a number of jets or sprays which are thrown outward under considerable pressure and strike against the gas within the casing. The water is supplied from a pipe 20, one end of which fits within the hollow shaft which is there provided with a suitable stuffing box or gland as indicated at 21. The shaft carries a rotor in the form of a beater or agitator comprising a pair of end disks 22 and 23 and an intermediate ring or annulus 24 which serves in connection with a partition wall 25 to divide the interior of the casing into two main compartments, one of which at the inlet side communicates with the inlet port 11 while the other communicates with the discharge port 12. The end disks 22 and 23 are rigidly secured to collars 26 on the shaft 16 and are held in properly assembled and spaced relation by tie bolts 28 and filling or spacing tubes 29. Arranged in the inlet compartment and supported in position in the rotor is a series of concentric cylindrical screens 30, which may be formed of wire netting or perforated metal, the inner one being of greater diameter than the opening of the ring 24 and held in place by a pair of supporting rings 31 and are secured to the disk 22 and ring 24. The position of these screens is such that all the gas entering the washer is compelled to pass through the screen before it can escape through the discharge port 12 and in passing through the screen the gas will be practically wire drawn or superdivided and while in this condition will be subjected to the action of the washing fluid which is reduced to the condition of a mist or cloud by the impact of the screens thereon, these screens being rotated at high speed. The disk 22 and the ring 24 serve as supports for a circular series of perforated blades 33 arranged near the periphery of the rotor and which operate to break up the gas and wire draw it through the perforations for the purpose of separating mechanical impurities therefrom, the blades further operating to carry the gas around within the casing so that the same may be subjected to the action of centrifugal force, which will tend to direct the heavier matters held in suspension, or any heavy vapors to the wall of the casing and the periphery of the rotor, while any relatively light purified and washed gases will naturally accumulate at the center of the rotor. As the entering gas passes through the screens 30 and then through the opening at the center of the ring 24 it is directed to the second compartment where it is acted on by a plurality of blades 35 that exercise a direct pull on the gas and tends to carry the same outward toward the periphery of the rotor, the gas being forced outwardly through the discharge port 12 in much the same manner as the escape of air from a blower.

It will be observed that in the operation of the washer shown in Figs. 1, 2 and 3 a number of principles involving various classes of cleaning, scrubbing and purifying apparatus are combined in a single structure, and in operation various impurities, in dry, liquid, semi-liquid and vaporous forms, are separated from the gas, these impurities passing downward through a discharge pipe or pipes 38 into a collecting tank, shown at 39 in Fig. 4, or into any other receptacle below the main casing, or the pipe or pipes 38 may be otherwise arranged for the disposal of the separated impurities. The dry impurities generally consist of dust, lampblack, metallic and ash particles; the liquid impurities of moisture and various compounds; the semi-liquid impurities of oils, tars, tarry matters and various viscous hydro-carbons and the vaporous impurities of aqueous vapor, viscous vapor or fogs, and inert or uncombined gases, such as carbon dioxid.

The gas entering the washer is cooled by the spray of water and this effects a change of vapor tension, and, also, change of volume, the reduction in temperature naturally causing condensation and a deposition of any heavy matters which are held in suspension. The change in volume is in part due to the change in temperature and further to the mechanical action of the rotor, resulting also in difference in pressure at different points within the casing. This change in pressure with the consequent variation in volume tends to press out excess moisture and cause the same to precipitate. A further and important action is that due to the centrifugal force. As the gas is carried around by the rotor, the heavy impurities will naturally be thrown outward to the wall of the casing, owing to their greater specific gravity, while clarified gases or vapors, relatively lighter than the unpurified gas itself will accumulate at the center, thus separating the impurities. In the second compartment the separating action is intensified by the outward pull of the blades. In this connection it will be noted that a segregation is made to take place through the opposition of centrifugal force to suction. This emphasizes, increases and intensifies the action of separation, the heavier impurities being thrown to the outside or periphery of the blades of the first section or stage; the lighter gases occupying the interior of the zone thus formed, which zone formation is intensified by the suction effort of the second stage or fan in opposition to the centrifugal action, the fan removing from the low pressure zone the gas thus segregated. Another important factor is the reversal of direction of the flow of gas. Any gas whose direction of flow is reversed or diverted tends to deposit saturation, entrainment, and impurities, this action being partly centrifugal and partly static in its nature. There is also the wire drawing action to be considered. All of the gas must pass through the reticulated screens and thus be mechanically strained and filtered, and at the same time by the action of the rapidly revolving rotor a violent whirling motion is given to the gas. While in this broken or divided condition the gas is subjected to the action of the jets of water which are traveling in a direction opposite to that in which the small streams of impure gas are moving.

The rotor is driven at a very high speed and the water spray on passing through the screens is beaten thereby into an exceedingly fine spray like a mist or cloud. At the same time this watery mist is given a whirling motion which causes it to move to the walls of the casing under the action of centrifugal force. The incoming impure gas is forced to traverse this violently agitated mist and is itself whirled about by the rotor, and thus the water is caused to present an extensive absorption surface because of its superdivision, and the intimate mixture therewith of the fine streams of gas causes the latter to be cleansed of nearly or quite all of the impurities. The cleansed gas is now in the interior of the rotor and because of the pulling or impelling action of the blades 35 flows through the annulus 24 into the second chamber carrying more or less moisture with it. The finely divided water passing out through the screens in the first compartment of the rotor, carries the absorbed gas impurities with it and strikes and clings to the walls of the casing, the fine water particles coalescing and forming into drops and streams and gravitating to the inlet 11 where they may escape into the gas containing vessel on which the gas washer is mounted. The cleansed gas passing to the second chamber or compartment in the rotor is driven by the impelling blades 35 to the periphery of the casing and finally through the outlet port or passage 12. In this second compartment the gas is given a whirling movement by the blades 35 and impurities and moisture, if present, are driven by centrifugal force to the inner wall of the casing finally to gravitate into the pipe 38.

Owing to the peculiar intimacy of intermixture of the various elements of which some gases are composed, and which are carried into the washer, there has been heretofore considerable difficulty in the production of a pure gas, but by subjecting it to the various actions and forces herein described it will be broken up and washed and purified in such manner as to separate not only the mechanical impurities and excess moisture but also chemical impurities such as ammonia, carbon dioxid, sulfur and other compounds which may be detrimental to the efficient use of the gas.

In the construction shown in Fig. 4 the operation is much the same as that heretofore described though the specific construction of the washer is somewhat modified. The central ring 24 is provided with a central hub and radial supporting arms and a suitable number of screens 30' are used. These screens are disposed in concentric relation to both the inlet and discharge compartments of the drum or rotor and the blades 35' are radial. The hub portions of the end disks of the drum or rotor are recessed as indicated at 40 and at the margin of each recess there is an inwardly extending flange 41 forming a circular liquid holding channel to which liquid is delivered by supply pipes 42. The treating liquid is driven by centrifugal force through a number of spray openings 43 and is directed against the gas in the interior of the drum.

In the structure of Fig. 4 the action of the device so far as the first compartment is concerned is the same as in the structure shown in Fig. 1 except that the blades 33 are not present, the gas passing to the interior of the rotor through screens 30', and the whirling mist of washing fluid against the action of centrifugal force. In the second compartment this action is reversed and the gas passes in the same direction as the washing fluid, both moving under the action of centrifugal force and both being violently whirled about and beaten to a super-divided state and thoroughly mixed.

In the structure shown in Figs. 5 and 6 the passage of the gas through the machine is the contrary of that of the structures of Figs. 1 and 4. In these figures there is shown a main casing 44 preferably of two parts bolted together like the structure of Fig. 1. At the upper portion of the casing are two ports 45, 46 extending down to the central part of opposite ends of the casing and these ports are provided with cylindrical flanges 47 that extend inward within the casing for a short distance in order properly to guide the course of the gas, the latter entering through the port 45 and being discharged through the port 46 or vice versa. The opposite side walls of the casing are provided with bushings 48 forming bearings for a shaft 49 which is provided at one end with a belt pulley 50 or other similar means for supplying power to the shaft. The shaft carries a rotary beater or agitator comprising end rings 51, 52 supported each by a central hub 53 and arms 54. At the center of the drum is a partition disk or web 55 rigidly secured to the shaft and dividing the drum or rotor into two compartments. One of these compartments communicates at its central portion with the inlet port 45 while the other compartment communicates at its central portion with the discharge port 46, and it may be noted that the internal diameter of the rings 51 and 52 is equal to the internal diameter of the flanges 47 so that the gas may freely flow into and from the eyes of the drum. Near the peripheries the rings 51 and 52 and the central web or disk 55 are formed with matching recesses for the reception of the ends of blades 56 arranged in circular series and which act as beaters or agitators and also serve to carry around the gas with them so as to cause the action of centrifugal force upon the gas. The adjacent faces of the rings and drum are provided with a plurality of annular matching grooves for the reception of a series of concentric screens 57, there being one set of screens in the inlet compartment and a similar set of screens in the discharge compartment, and the gas passes through these screens in the order named. The diameter of the drum is sufficiently less than the internal diameter of the casing to form an annular space in which the gas and impurities may accumulate while the impurities reaching and adhering to the inner wall of the casing may flow down the same and be directed through one or more discharge pipes 58 into a collecting tank 59, these impurities being drawn off at any time or continuously as circumstances may require, or the impurities so escaping may be directed elsewhere. At opposite ends of the casing are arranged liquid inlet spray pipes, 60, these being disposed in axial alinement or otherwise in such position as to direct one or more jets of liquid into the interior of the drum and preferably against the opposite side of the disk or web 55 to form a more or less finely divided spray.

Gas entering through the inlet port 45 will enter the first compartment of the rotor or drum at the central portion of the latter and will pass through the screens 57 with the watery spray entering through the pipes 60 in the direction of the action of centrifugal force, and the screens 57 and blades 56 will highly subdivide the gas and water and impart a rapid whirling motion to both, the rotor being driven at a high speed, thus tending to cause the separation of impurities from the gas and the accumulation of the same and the watery mist together with the vapor on the walls of the casing, whence the water and impurities will flow down to the pipe or pipes 58 and into the receptacle 59 or to other points of disposal. The gas now passes into the second compartment entering the same by way of the spaces between the blades 56 and through the screens 57 in a direction opposed to the action of centrifugal force and through a whirling and highly agitated mist or cloud of watery vapor moving in the opposite direction to the flow of the gas. The cleansing of the gas takes place wholly or in the main as the gas is passing from the central inlet of the first compartment to the space surrounding the rotor and therefore a markedly clean gas results. On passing to the interior of the second compartment of the rotor from the space exterior thereto the gas must traverse the highly attenuated watery mist in great agitation and violently whirling. The retardation of the flow of gas toward the exit side of the rotor results in the establishment of a gas pressure in the chamber about the rotor thus still further facilitating the deposition of any impurities in the gas. Although the first treatment to which the gas is subjected cleanses the same very thoroughly, there may still be some impurities remaining in the gas and the second treatment against the action of centrifugal force causes the removal from the gas of impurities which still may be carried thereby and the escaping gas is practically free from deleterious impurities as demonstrated. Causing the gas to traverse the screens against the action of centrifugal force also tends to dry the gas even though the watery spray must also be traversed.

In the structure of Fig. 7 there is a casing 61 having one side 62 removable, and this side is formed with a central eye 63 traversed by spokes or radial arms 64 supporting a bearing 65 for one end of a shaft 66 on which is mounted a rotor comprising a hub 67 from which there extends in a general radial direction a web or disk 68 having on its inner face near the periphery a series of concentric grooves each receiving one end of a corresponding one of a concentric series of cylindrical screens 69. Interior to the screens the hub 66 is formed with elongated spacing studs 70 having secured at their free ends an annular plate 71 grooved to receive and hold the other edges of the screens 69. The annular plate 71 has its interior diameter the same as that of the eye 63 of the side 62 of the casing. In the structure just described the gas enters through the eye 63 and out to the screen 69 to the space between the outer screen and the inner wall of the casing and from this space the gas passes directly to an outlet port. Water is introduced to the eye of the rotor by suitable spraying pipes 60 as in the structures of Figs. 5 and 6.

In the structure of Fig. 7 the gas is subjected to the same treatment as in the first compartment of the structure of Fig. 5 and thence passes directly to the point of utilization or storage without being subjected to a second treatment as in the structure of Fig. 5.

This application is a division of other applications Numbers 517,065, and 517,066, filed by me on September 10, 1909, for improvements in gas washers.

What is claimed is:

1. The method of treating gas which consists in causing the movement of the gas in wire drawn condition through a whirling mist or cloud of a treating fluid in a direction contrary to the action of centrifugal force on said treating fluid.

2. The method of treating gas which consists in causing a whirling movement of the gas in wire drawn condition and a whirling mass of treating fluid in intimate relation, the treating fluid moving under the action of centrifugal force and the gas moving in a direction contrary to centrifugal force.

3. The method of treating gas which consists in producing a whirling mass of treating fluid in the form of a mist or cloud yieldable to the action of centrifugal force generated by the rotative movement of the said mass, and causing the gas being treated to traverse said mass in wire drawn condition and in a direction opposed to the action of centrifugal force.

4. The method of treating gas which consists in producing a whirling mass of treating fluid in the form of a mist or cloud yieldable to the action of centrifugal force generated by the rotative movement of said mass, and wire drawing the gas and causing it to traverse said mass in a direction opposed to the action of centrifugal force and at the same time imparting a whirling movement to and subdividing the gas in intimate relation to the treating fluid.

5. The method of treating gas which consists in causing a movement of the gas in wire drawn condition through a whirling mist or cloud of treating fluid in a direction contrary to the action of centrifugal force on the said treating fluid, and then directing the gas into another path and there subjecting it to rotative or whirling movement and the action of centrifugal force.

6. The method of treating gas which consists in producing a whirling mass of highly subdivided treating fluid and causing the gas being treated to traverse said mass in a wire drawn condition and a direction opposed to centrifugal force, the intermingled mass of gas and cleansing fluid being subject to the centrifugal force generated by their rotative movement.

7. The method of treating gas which consists in causing the gas and a treating fluid intimately to intermix by wire drawing them while moving at high speed, and subjecting the mass while being thus intermixed to the action of centrifugal force due to the rotary motion imparted thereto.

8. A method of treating gas to cleanse it of impurities, which consists in drawing the gas by suction centripetally through centrifugally moving sprays, whereby to intensify the concentric stratifications of the gas and its impurities, the heavy impurities being thrown into the outer concentric stratas and the cleansed gas being drawn to the center.

9. A method of cleansing gas which consists in screening the gas and drawing it centripetally by suction through centrifugally moving radiating sprays.

In testimony that I claim the foregoing as my own, I have hereto affixed my signature in the presence of two witnesses.

PETER G. SCHMIDT.

Witnesses:
E. F. FOSTER,
A. J. COLLY.